May 18, 1965

F. SCRAGG ETAL 3,183,730

HIGH SPEED SPINDLE ASSEMBLY

Filed Oct. 2, 1961

INVENTORS
Frederick Scragg
and Alexander Gilbert Chubb
BY
Michael S. Striker
Attorney May 18, 1965  F. SCRAGG ETAL  3,183,730
HIGH SPEED SPINDLE ASSEMBLY
Filed Oct. 2, 1961  4 Sheets-Sheet 4

INVENTORS
Frederick Scragg
and Alexander Allan
BY
Michael S. Striker
Attorney

United States Patent Office 3,183,730
Patented May 18, 1965

3,183,730
HIGH SPEED SPINDLE ASSEMBLY
Frederick Scragg and Alexander A. Chubb, Macclesfield,
England, assignors to Ernest Scragg & Sons Limited,
Macclesfield, England
Filed Oct. 2, 1961, Ser. No. 142,271
Claims priority, application Great Britain, Oct. 1, 1960,
33,776/60; Mar. 16, 1961, 9,594/61
16 Claims. (Cl. 74—206)

The present invention relates to high speed drive assemblies such as a high speed spindle drive for driving a false twist spindle for textile yarns, although the invention is equally applicable to other types of shafts or spindles adapted to rotate at high speeds, such as spindles of dental drills, interior grinders, and metal shaping cutters.

In the case of false twist spindles particularly it is extremely important to provide the highest possible rotary speed of the spindle because the output of the twister will increase with the speed of the false twist spindle. Various attempts have already been made to provide high speed spindles of this type, notably arrangements where a "floating" spindle engages rotary elements of a diameter substantially larger than the spindle so that the spindle itself rotates at a speed several times that of the rotary elements. However, the disadvantage of these arrangements is that they include a considerable amount of unsprung elements incapable of absorbing vibrations, particularly high frequency vibrations which occur during rotation of the spindle at high speeds, and therefore in practice it is necessary to limit the speed of the spindle to the vibration-absorbing capacity of these known structures.

It is accordingly a primary object of the present invention to provide a high speed spindle assembly wherein it is possible to absorb vibrations at high frequencies so that the rotational speed with the assembly of the invention can be increased considerably above the limits of heretofore known constructions.

Another object of the present invention is to provide an arrangement where the spindle is driven by an element which is urged centrifugally into engagement with the spindle.

A further object of the present invention is to provide a driving assembly where unsprung elements are at a minimum.

An additional object of the present invention is to provide a structure capable of accomplishing the above objects and at the same time composed of simple rugged elements capable of operating efficiently over a long period of time.

With the above objects in view the invention includes, in a high speed spindle assembly, a rotary spindle and a locating means locating the spindle at a predetermined location, this locating means preferably being composed of resilient rollers which engage the spindle. A rotary drive means cooperates with the spindle to rotate the same, and the rotary drive means of the invention includes a flexible body having a peripheral surface located closely adjacent to the spindle and pressing against the spindle as a result of centrifugal force of the flexible body during rotation thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

A false twist spindle S (FIG. 1) is positioned by a locating device comprising two pairs of overlapping rollers of which only one roller L and one roller L' are shown. The roller pair including the roller L are rotatable around in axis A and the roller pair including the roller L' are rotatable around an axis A'. A driving support D is adapted to be driven so as to rotate about an axis B and is connected to a body of revolution of flexible material presenting a surface C. The axes A and A' are at a fixed distance apart and the axis B is fixed relative to the axes A and A' in such a position that when the driving support and therewith the surface C are at rest the spindle fits quite loosely and lightly against the surface C or indeed may be clear of the surface C when in contact with the rollers L and L'.

On rotation of the driving support D so that the surface C is caused to move in a generally circular path around the axis B, centrifugal force causes deformation of the material presenting the surface C causing the surface to expand into a position Ce and to assume a size such that the circular path described by the centrifugally expanded surface Ce intersects the surface of the spindle S even when the spindle is in contact with both the rollers L and L'. Under these conditions the centrifugally loaded surface Ce is slightly deformed inwardly against the action of centrifugal force and in moving past the spindle it exerts a driving engagement thereon.

Figure 1:
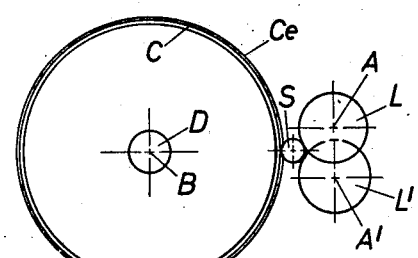
FIG. 1 is a diagram illustrating the principle of centrifugal loading of a driving surface engageable with a false twist spindle which is positioned by a pair of rollers constituting a locating device.
Figure 2:
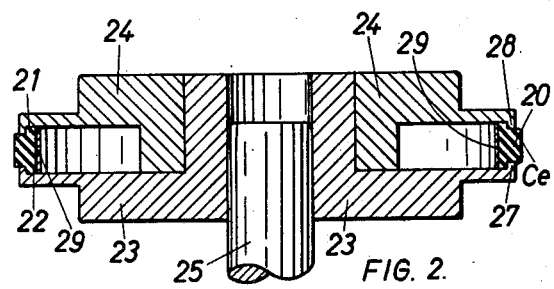
FIG. 2 is a section showing a preferred form of centrifugally loaded driving surface.

Slight vibrations of the spindle surface, even of the highest frequencies which may be of the order of some thousands of cycles per second, can then be absorbed by the moving centrifugally loaded driving surface Ce, especially if the amplitude of such vibrations is well within the range of expansion from the rest condition of the surface C to its expanded condition Ce.

Where the surface C expands under centrifugal loading to a surface Ce of larger external diameter, as shown in FIG. 1, the preliminary setting in the stationary state is preferably such that the surface C is out of contact with the spindle S. Centrifugal loading without appreciable expansion is however possible, for this the driving surface should be initially touching the spindle so that its engagement thereon can be increased due to centrifugal loading without necessarily expanding the surface. FIG. 2 illustrates such a driving surface.

A preferred form of annular driving element presenting the centrifugally loaded surface Ce is constituted by a tire 20 (FIG. 2) of a rubber-like plastics material such as a medium grade polyurethane. This tire 20 has drive-receiving flanges 21 and 22 on its respective end faces, these flanges extending radially outwards to about one-third of the radial thickness of the tire.

The driving support D is in the form of two wheels 23 and 24 spaced apart and supported on a drive shaft, e.g. the wheel 23 is fixed to the shaft 25 and the wheel 24 is fixed to the wheel 23. The wheels 23 and 24 have external peripheral flanges 27 and 28 respectively which extend towards one another and which are separated by an axial distance of the order of the axial length of the unflanged part of the tire 20. The flanges 21 and 22 preferably have an external diameter in the stationary condition which is slightly less than the internal diameter of flanges 27 and 28. The tire may advantageously be provided with reinforcement to limit expansion and flexure in its inner peripheral or flanged region, for instance by inclusion adjacent the inner periphery of a reinforcing fabric web 29.

Figure 3:
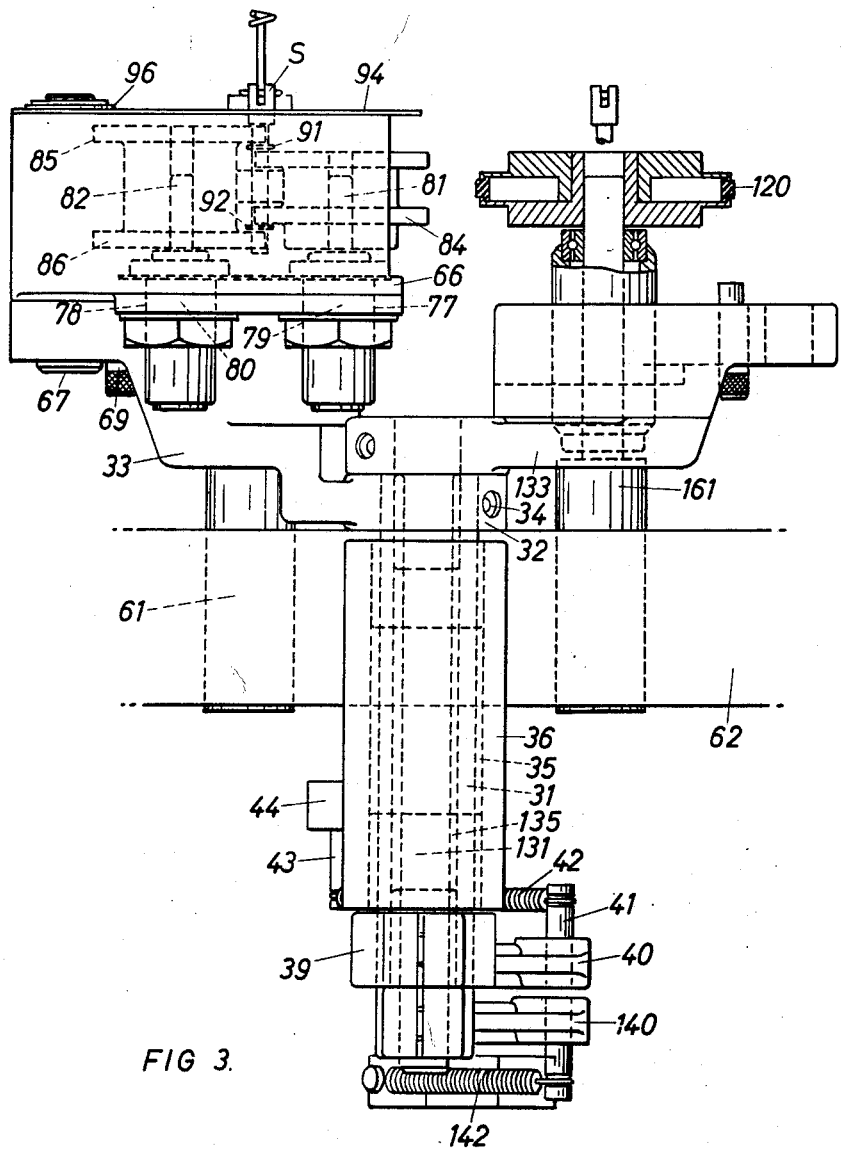
FIG. 3 is a front elevation of a dual unit wherein two false twist spindles are driven adjacent to one another.

In a preferred form of construction a dual unit is provided having two sets of parts arranged adjacent to one another so that pair of yarns travelling in adjacent paths may be treated simultaneously. Such a dual unit is illustrated in FIGS. 3 to 5 inclusive and, since the majority of the parts are duplicated, the construction and operation of only one half of this dual unit will be described hereinafter except where, for the sake of clarity, it is considered preferable to describe both halves.

A rotatable hollow shaft 31 (FIG. 3) has an eye 32 of a drive frame 33 fixed at its upper end, for instance by a grub screw 34 engaged in a radial tapped bore in the eye 32. The shaft 31 is swingable about a vertical axis, fitting in a bearing bush 35 pressed into a fixed tubular housing 36 carried on the machine framework. At the lower end beneath the bush and tube the shaft 31 is gripped in a split eye 39 of a lever 40. The lever 40 carries a pin 41 (FIG. 4) which is grooved to provide an anchorage for one end of a spring 42, the other end of which is anchored in a groove of a pin 43 depending from a lug 44 integral with the tubular housing 36. The spring 42 thus urges the lever 40 in an anticlockwise direction (as viewed from above) relative to the frame of the machine, and hence tends to rotate the shaft 31 anticlockwise in the bush 35.

Figure 4:
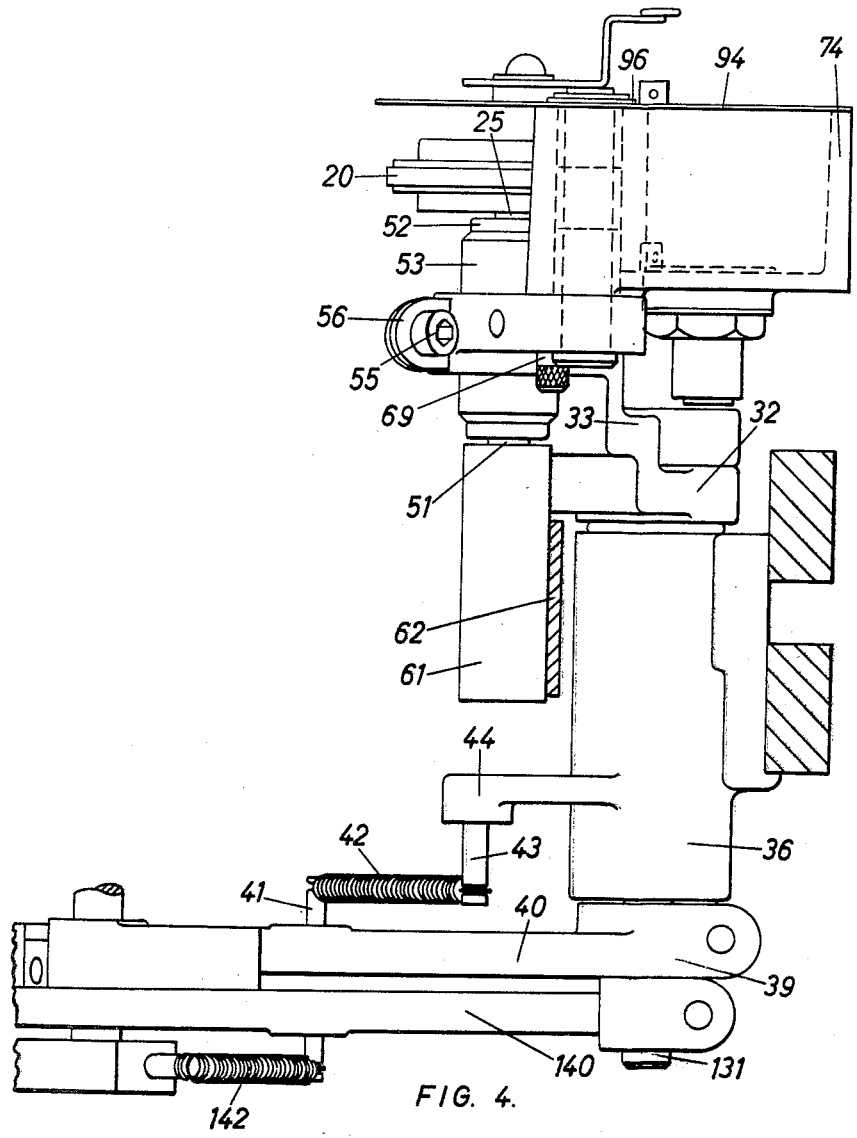
FIG. 4 is a side elevation of the unit of FIG. 3.
Figure 5:
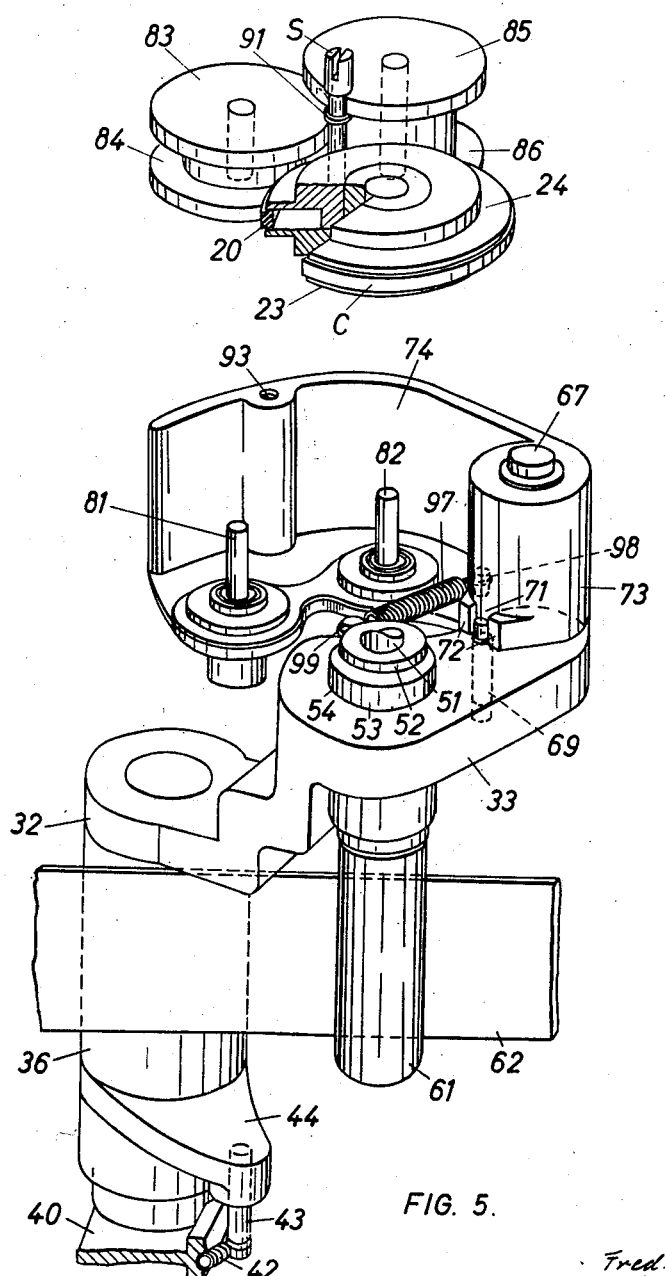
FIG. 5 is a fragmentary rear perspective view of part of such a unit slightly simplified for the sake of clarity.

The drive frame 33 provides bearing support for a drive shaft 51 (FIG. 4). The shaft 51 is carried in an upper ball bearing 52 and in a similar lower bearing, these bearings being housed in a bearing shell 53 fitting in a bore 54 in the drive frame 33 (FIG. 5). The bearing shell 53 can be clamped in a desired position in the bore 54 by a bolt 55 for tightening a split lug 56 (not illustrated in FIG. 5, see FIG. 4) adapted to contract the bore 54 into gripping engagement with the bearing shell 53. At its lower end the shaft 51 carries, or has integrally formed therewith, a drive receiving roller 61 which, in the operative position, is urged into contact with a driving belt 62 moving along the frame of the machine and adapted to drive a plurality of dual units. The upper end of the drive shaft 51 carries the spaced wheels 23 and 24 provided with the tire 20 as previously described with reference to FIG. 2.

In this preferred construction the locating device is mounted on a bogie frame 66. This bogie frame is pivotable on a pin 67 fixed to the drive frame 33, through an angular range controlled by a post 68 formed as an eccentric upward extension of an adjustable peg 69 which can be locked by a set screw in a desired position in a bore in the drive frame 33. The post 68 controls the movement of the bogie frame 66 by abutting against one or other faces of a radial slot 71 in a lug 72 disposed at the lower end of a tubular boss 73 integrally formed as part of the bogie frame 66. The bogie frame 66 has an upstanding wall 74 extending around one of its sides and its front edges and it is provided with two vertical bores 77 and 78 within which are respectively fitted bearing shells 79 and 80 respectively carrying shafts 81 and 82 on which are mounted rollers 83, 84 and 85, 86 of the locating device. With the rollers the frame 66 thus forms a complete bogie which is displaceable towards or away from the drive surface of the tire 20. The rollers 83, 84 are made as an integral spaced pair preferably from some hard material of resilient character such as hard grade polyurethane. The rollers 85, 86 are similarly constructed except that the two rollers of this pair are spaced further apart so as to straddle the pair of rollers 83, 84. The false twist spindle S which is hollow and includes the usual twisting pin is preferably provided with a pair of radiused peripheral flanges 91 and 92 to provide axial location, i.e. in a vertical direction. Thus the flange 91 may be engaged between the upper face of the upper roller 83 and the lower face of the upper roller 85; likewise the flange 92 may be engaged between the lower face of the lower roller 84 and the upper face of the lower roller 86.

The upstanding wall 74 of the bogie frame 66 is provided with a bore 93 by means of which a cover plate 94 (FIG. 4) may be held on to the bogie frame, this cover plate also having a circular aperture engageable around an upstanding spigot on the boss 73 and retained thereon by means of a circlip 96.

As described above the bogie including the rollers 83, 84 and 85, 86 of the locating device is adapted for limited pivotal movement relative to the drive frame 33 and hence the locating means also have limited movement towards and away from the centrifugally loadable drive surface C of the tire 20. A spring 97 is anchored at one end in an eye 98 formed integrally near the lower end of the lug 72 of the bogie frame and at its other end is anchored in a groove around a pin 99 up-standing from the drive frame 33. The bogie frame 66 is preferably limited in its pivotal movement under the influence of the spring 97 towards the drive frame 33 by the post 68 at such a setting that conditions generally as described with reference to FIG. 1 obtain. In other words in this limiting position the spindle S is either free of the drive surface C of the tire 20 in the stationary state, or is only very lightly engaged therewith. The strength of the spring 97 is so selected that it retains the bogie including the locating device in this limiting position i.e. closest to the drive frame 33 under normal operating conditions and to do this the force exerted by the spring 97 acting in the direction to urge the spindle S towards the centrifugally loaded surface of the tire 20 must be greater than the force exerted by said centrifugally loaded surface on the spindle S. With this combination high frequency vibrations are readily absorbed by the centrifugally loaded surface of the tire 20, oscillations in medium range can be accepted by the rollers 83, 84 and 85, 86 being compressed or otherwise deformed, and low frequency displacements which may occur from time to time can be allowed for by the displaceability of the bogie away from its limiting approach position against the action of the spring 97.

As previously mentioned the lever 40 serves to urge the drive receiving roller 61 into engagement with the driving belt 62. By provision of a suitable cam mounted on a shaft operated by a control arm the lever 40 may be moved from a position wherein the roller 61 engages the belt 62 so as to be driven thereby, into an inoperative position and vice versa.

In the dual unit two levers are provided; in addition to the previously described lever 40 there is a generally similar lever 140 which is fixed to the lower end of a shaft 131 passing through a bush 135 which is fixed within the hollow shaft 31. The upper end of this shaft 131 is fixed to a drive frame 133 carrying a drive receiving roller 161 and a drive support with tire and having a bogie with the locating device rollers thereon similar to that previously described. The lever 140 is urged towards the cam by a spring 142 extending between it and the machine frame housing 36 and a further spring (not shown) interconnects the two levers and pulls them both towards the cam.

The cam may be arranged to bring both halves of the dual unit out of operative condition simultaneously whilst alternatively or additionally the levers 40 and 140 may be separately actuated.

By designing the diameters of the rollers 61 and 161 so as to be substantially less than the diameters of the driving surfaces of the tire 20 and another 120 these driving surfaces will travel at an appropriately higher peripheral speed than the speed of the driving belt, thereby enabling an increased spindle speed to be obtainable with a normal driving belt speed.

In the embodiments of FIGS. 3, 4 and 5 both drive receiving rollers 61 and 161 engage on the reverse face of the belt. In so doing the two spindles are of course revolved in the same direction but where it is required to revolve these spindles in opposite directions, as for instance when S and Z twists are respectively required in each of a pair of yarns moving in adjacent paths, the dual unit should be positioned relative to the belt, so that one drive receiving roller engages behind the belt and the other in front of it. This involves a modification of the control levers 40 and 140 so that both operate in the same direction.

Figure 6:
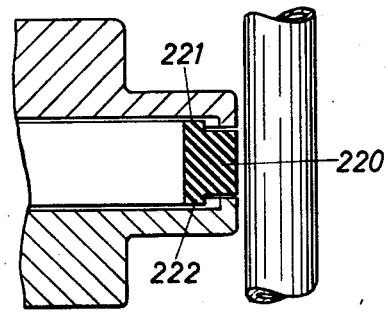
FIG. 6 is a view similar to that of FIG. 2 showing an alternative form of driving element in the stationary state.
Figure 7:
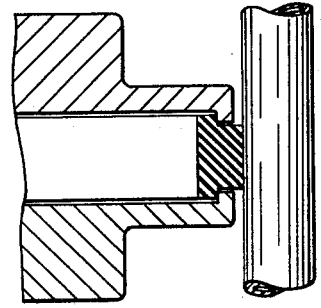
FIG. 7 is a view similar to that of FIG. 6 but with the driving element in the centrifugally loaded state.

In the construction of FIG. 2 there is shown a tire 20 with edge regions 21 and 22 each having an external diameter in the stationary state which is substantially equal to the internal diameter of the wheel flanges. For this form of tire it is preferable to set the tire driving surface just in contact with the spindle in the stationary state. Then when the tire revolves it is centrifugally loaded against the spindle and its edge regions are probably unseated from the inner peripheries of the wheel flanges in the immediate vicinity of the spindle. FIG. 6 shows a modified tire 220 with edge regions 221 and 222 each having an external diameter in the stationary state which is less than the internal diameter of the wheel flanges. On rotation of the tire centrifugal force then expands it as a whole until the edge regions (FIG. 7) are constrained by the wheel flanges. For this embodiment the initial setting should preferably be such that the spindle is spaced slightly clear of the tire surface whilst the radial amount of expansion permissible is preferably slightly in excess of this spacing.

Instead of loading the flexible driving element largely by a shearing force, which in fact is more advantageous to the life of the material if a synthetic rubber-like plastics material is used for the tire, it is possible to arrange for the loading to cause deformation largely of a bending nature. In this case (FIG. 8) the element 320 has an outer flanged part 321 which can bend into contact under the action of centrifugal force with the spindle S. The surface of the spindle S may be appropriately curved where this driving contact is to take place and if desired the shaping of the spindle S in this instance may contribute to the axial location of the spindle.

The invention is based on the discovery that a smooth and vibration-damping engagement at very high speeds is obtainable between a centrifugally loaded driving surface and a spindle positioned by a locating device. Such centrifugally loaded driving surface is preferably presented by a flexible body of revolution mounted on a driving support. The driving support is preferably mounted relative to the locating device for the spindle such that in the stationary state and at low speeds the spindle either floats free of the driving surface or is only engaged very lightly therewith, whereby the predominant force causing driving engagement results from the tendency to radial expansion of the loaded surface due to centrifugal action. The locating means may be fixed or it may advantageously be displaceable away from a limited approach position relative to the driving surface against a restoring force, for instance exerted by spring mechanism or by gravitational action, which may be exceeded by the displacing force caused by centrifugal action at high speeds of rotation of the driving surface. Alternatively or additionally some vibration damping may be derived in that the rollers of the locating device are made of relatively hard resilient material. The combination of a centrifugally loaded driving surface of resilient material with locating rollers of harder material displaceably mounted so as to be urged by a spring-exerted restoring force towards a stop position, wherein at low speeds the spindle is engaged with the driving surface to not more than a limited extent, results in a spindle drive which is remarkably smooth and reliable at very high speeds. This result is believed to flow from a three-fold vibration damping whereby the highest vibrational frequencies, e.g. of the order of thousands of cycles per second upwards, are absorbed by the centrifugally loaded driving surface, medium oscillations are accommodated by yielding of the harder resilient material rollers of the locating device and in the embodiment in which the locating device is displaceable, low frequency displacements are compensated by corresponding movements of the locating rollers against the restoring force.

Figure 8:
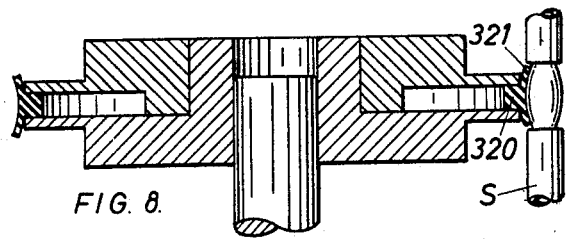
FIG. 8 is a diagrammatic view showing a further alternative form of driving element in which the centrifugally deformed surface is flexed rather than sheared.

The centrifugally deformable driving surface may be presented by a flanged flexible external peripheral part of an annular driving element which may be a tire, carried by a rigid support such as a wheel, or forming part of a wheel fixed on a rigid shaft driving support (FIG. 8). Flexure of such flange under centrifugal action allows its free edge to move in a radially outward direction thereby applying increased pressure to the floating false twist spindle. This flexing action of the flange may however be detrimental to the working life of many materials having the required frictional coefficient relative to a steel spindle, e.g. when the driving element is composed of a synthetic rubber-like plastics material. Materials of this kind are better adapted to act as live loaded members in shear and in one preferred embodiment (FIG. 6) a tire having a floating central region and limited expansion or anchored end edge regions is used. The central region may project through a gap defined by adjacent peripheral flanges on two axially spaced wheels, the edge regions being restrained from outward movement by engagement due to centrifugal action against the inner peripheries of the flanges.

This design of tire and driving support shown in FIG. 6 has several advantages. Thus the amount of expansion of the tire is predetermined and therefore the extension of the tire material can be kept within its elastic limit. Again, since the flexible tire may be free to slide inside the flanges until it reaches a speed at which it is adequately driven, the rate at which the false twist spindle is run up to speed can be made slow thus giving a smooth start. Again, since the expansion of the tire is predetermined, its elastic qualities can be chosen and employed separately from its coefficient of friction so that a better drive to the spindle may result. The advantage of the centrifugal drive, i.e., that only one small portion of the tire is deflected when in contact with the spindle and therefore "unsprung" weight is reduced to a minimum, remains in full.

In the alternative embodiment (FIG. 2) the wider part of the tire, which may be regarded as a bead, is made of substantially the same diameter as that of the inner faces of the wheel flanges 27 and 28. This modified design ensures that the tire is subjected to substantially no circumferential extension during use and thus enables a very soft material to be employed whilst preventing any elongation creep due to continued application of centrifugal force. The axes of the locating device rollers and driving element axis are so relatively located that the false twist spindle produces a slight depression in the surface of the tire at the point with which it is in contact, pushing the tire bead at that point away from contact with the wheel flanges. Thus whilst the drive to the spindle still exists by virtue of the centrifugal force exerted by the tire, no expansion of the tire is involved so that the material is operated under conditions of shear at the bead edges, and compression at the driving face, these two stresses being more suitable for employment in connection with plastic material than tension.

Although the tire described above is restrained at its edges, restraint may if required be applied to its center. In this case the tire would be supported between wheels as previously described but the wheels themselves would not prevent its outward expansion. This latter may be achieved by the provision of a thin steel ring sunk into the slot formed in the center of the outer face of the tire, the slot having a bottom diameter which when the tire is stationary, is less by a predetermined amount than the diameter of the steel ring.

Various alternative driving combinations are possible. For example there may be two or more driving elements engaging the floating spindle at different loci around its periphery whilst the locating device is not necessarily composed of two parallel rollers. A single locating roller may act to position the floating spindle relative to two driving surfaces, or one or more of the locating device rollers may be substituted by a fixed locating element such as a very hard surface presented by a stationary wear-resistant bearing element, e.g. a block of sapphire or hard carbide.

It will be understood that each of the elements described above, or two or more together, may also find a useful application in other types of high speed spindle drive differing from the types described above.

While the invention has been illustrated and described as embodied in high speed false twist spindle drive, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a high speed assembly, in combination, a rotary substantially rigid spindle; locating means locating said spindle at a given location; an endless flexible body having an outer periphery located closely adjacent to said spindle; and rotary support means carrying said flexible body for rotating the same while freeing said body throughout the entire cross section thereof to the influence of centrifugal force resulting from rotation thereof so that said body will engage and drive said spindle while pressing against the same as a result of the centrifugal force, the pressure of said body against said spindle being derived solely from the mass of said body itself and the rotation thereof.

2. In a high speed assembly, in combination, a rotary substantially rigid spindle; locating means locating said spindle at a given location; an endless flexible body having an outer periphery located closely adjacent to said spindle; and rotary support means carrying said flexible body for rotating the same while freeing said body throughout the entire cross section thereof to the influence of centrifugal force resulting from rotation thereof so that said body will engage and drive said spindle while pressing against the same as a result of the centrifugal force, the pressure of said body against said spindle being derived solely from the mass of said body itself and the rotation thereof, said outer periphery of said body having a non-driving relation with respect to said spindle when said rotary support means is stationary and when said rotary support means rotates at relatively low speeds.

3. In a high speed assembly, in combination, a rotary spindle; locating means locating said spindle at a given location; rotary drive means engaging said spindle to drive the same and pressing against said spindle with centrifugal force resulting from rotation of said rotary drive means; support means supporting said locating means for movement to and from an operating position locating said spindle at said given location; spring means urging said locating means toward said operating position thereof; and limiting means cooperating with said locating means for limiting movement thereof in opposition to said spring means away from said operating position.

4. In a high speed assembly, in combination, a rotary spindle; locating means locating said spindle at a given location; a rotary drive means engaging said spindle to drive the same and pressing against said spindle with centrifugal force resulting from rotation of said rotary drive means; support means supporting said locating means for movement to and from an operating position locating said spindle at said given location; spring means urging said locating means toward said operating position thereof; and limiting means cooperating with said locating means for limiting movement thereof in opposition to said spring means away from said operating position, the centrifugal force of said rotary drive means opposing said spring means to an extent insufficient to displace said locating means in opposition to the spring means away from said operating position at relatively high speeds of said rotary drive means.

5. In a high speed assembly, in combination, a rotary spindle; locating means locating said spindle at a given location, said locating means including rollers engaging said spindle and made of a relatively hard resilient material; and rotary drive means engaging said spindle with a flexible material softer than the material of said rollers to drive said spindle and pressing against said spindle with centrifugal force resulting from rotation of said rotary drive means.

6. In a high speed assembly, in combination, a rotary substantially rigid spindle; locating means locating said spindle at a given location; an annular flexible body having an outer periphery located closely adjacent to said spindle; and rotary support means carrying said flexible body for rotating the same while freeing said body throughout the entire cross section thereof to the influence of centrifugal force resulting from rotation thereof so that said body will engage and drive said spindle while pressing against the same as a result of the centrifugal force, the pressure of said body against said spindle being derived solely from the mass of said body itself and the rotation thereof.

7. In a high speed assembly, in combination, a rotary substantially rigid false twist spindle; locating means locating said spindle at a given location; a flexible tire having an outer periphery located closely adjacent to said spindle; and rotary wheel means carrying said tire for rotating the same while freeing said tire throughout the entire cross section thereof to the influence of centrifugal force resulting from rotation thereof so that said tire will engage and drive said spindle while pressing against the same as a result of centrifugal force, the pressure of said tire against said spindle being derived solely from the mass of said tire and the rotation thereof.

8. In a high speed assembly, in combination a rotary substantially rigid false twist spindle; locating means locating said spindle at a given location; a tire having an outer periphery located closely adjacent to said spindle, said tire being made of synthetic plastic material having the properties of rubber; and rotary wheel means carrying said tire for rotating the same while freeing said tire throughout the entire cross section thereof to the influence of centrifugal force resulting from rotation thereof so that said tire will engage and drive said spindle while pressing against the same as a result of centrifugal force, the pressure of said tire against said spindle being derived solely from the mass of said tire and the rotation thereof.

9. In a high speed assembly, in combination, a rotary spindle; locating means locating said spindle at a given location; a flexible tire having between opposed side faces a central annular portion the outer periphery of which is located closely adjacent to said spindle; a pair of coaxial wheel members fixed to each other and substantially coaxially supporting said tire between said wheel members, said wheel members respectively having annular coaxial flanges of the same diameter extending toward each other and defining between themselves a gap through which said central annular portion of said tire freely extends, said flanges engaging edge portions of said tire adjacent said side faces thereof during rotation of said wheel members and tire to limit centrifugal expansion of said tire while said periphery of said central portion thereof engages said spindle to rotate the same while pressing against said spindle as a result of the centrifugal force of the rotating tire, the inner periphery of said tire being out of engagement with any other elements.

10. In a high speed assembly, in combination, a rotary spindle; locating means locating said spindle at a given location; a flexible tire having between opposed side faces a central annular portion the outer periphery of which is located closely adjacent to said spindle; a pair of coaxial wheel members fixed to each other and substantially coaxially supporting said tire between said wheel members, said wheel members respectively having annular coaxial flanges of the same diameter extending toward each other and defining between themselves a gap through which said central annular portion of said tire freely extends, said flanges engaging edge portions of said tire adjacent said side faces thereof during rotation of said wheel members and tire to limit centrifugal expansion of said tire while said periphery of said central portion thereof engages said spindle to rotate the same while pressing against said spindle as a result of the centrifugal force of the rotating tire, said edge portions of said tire having, when said wheel members and tire are at rest, outer diameters substantially equal to the inner diameters of said flanges, respectively, the inner periphery of said tire being out of engagement with any other elements.

11. In a high speed assembly, in combination, a rotary spindle; locating means locating said spindle at a given location; a flexible tire having between opposed side faces a central annular portion the outer periphery of which is located closely adjacent to said spindle; a pair of coaxial wheel members fixed to each other and substantially coaxially supporting said tire between said wheel members, said wheel members respectively having annular coaxial flanges of the same diameter extending toward each other and defining between themselves a gap through which said central annular portion of said tire freely extends, said flanges engaging edge portions of said tire adjacent said side faces thereof during rotation of said wheel members and tire to limit centrifugal expansion of said tire while said periphery of said central portion thereof engages said spindle to rotate the same while pressing against said spindle as a result of the centrifugal force of the rotating tire, said edge portions of said tire having, when said wheel members and tire are at rest, outer diameters less than the inner diameters of said flanges, respectively, the inner periphery of said tire being out of engagement with any other elements.

12. In a high speed assembly, in combination, a rotary spindle; locating means locating said spindle at a given location; a flexible tire having an outer peripheral surface located closely adjacent said spindle and said tire having at its outer periphery a pair of outwardly directed flexible annular flanges; a pair of coaxial wheel members fixed to each other and substantially coaxially supporting said tire inwardly of said flanges thereof between said wheel members, the latter defining between themselves a gap in which said tire is freed to centrifugal force resulting from rotation with said wheels so as to press against said spindle, said flanges of said tire pressing also against said spindle due to centrifugal force during rotation of said tire, the inner periphery of said tire being out of engagement with any other elements.

13. In a high speed assembly, in combination, a rotary spindle; locating means locating said spindle at a given location, said locating means including parallel pairs of overlapping rollers, each pair of overlapping rollers defining a predetermined gap between its overlapping portions and the overlapping portions of said pairs of rollers being in alignment so that said gaps are aligned with respect to each other, and said spindle having peripheral flanges respectively located in said gaps for positioning said spindle axially; and rotary drive means engaging said spindle to drive the same and pressing against said spindle with centrifugal force resulting from rotation of said rotary drive means.

14. In a high speed assembly, in combination, a rotary spindle; locating means locating said spindle at a given location; an annular flexible body having an outer periphery located closely adjacent to said spindle; and rotary support means carrying said flexible body for rotating the same while freeing said body to the influence of centrifugal force resulting from rotation thereof so that said body will engage and drive said spindle while pressing against the same as a result of the centrifugal force, the pressure of said body against said spindle being derived solely from the mass of said body itself and the rotation thereof, said rotary support means including a driving roller of a diameter substantially smaller than that of said annular body engaged by a driving belt for rotating said roller and said rotary support means and flexible body therewith.

15. A drive assembly comprising, in combination, a rotary substantially rigid shaft which is to be driven; support means and a rotary flexible member engaging said shaft under centrifugal force to drive the later, said support means supporting said rotary flexible member for rotation while freeing said flexible member throughout the entire cross section thereof to the influence of said centrifugal force, said rotary flexible member extending in part around said shaft and being radially depressed by said shaft while rotating the same, the pressure of said flexible member against said shaft being derived solely from the mass of said flexible member and the rotation thereof.

16. In a high speed assembly, in combination, a rotary spindle; an annular expandable member; and rotary support means carrying said member for rotating the same while freeing said member throughout the entire cross section thereof for centrifugal expansion to press against and drive said spindle, the pressure between said member and spindle being derived solely from the mass and rotation of the annular member itself, and said rotary support means limiting the extent of expansion of said member.

References Cited by the Examiner

UNITED STATES PATENTS

| 317,680 | 5/85 | Shattuck | 308—203 X |
| 640,770 | 1/00 | Howell | 74—203 |
| 1,162,125 | 11/15 | Bassett | 308—184 X |
| 1,443,335 | 1/23 | Atwood | 74—214 |
| 1,443,337 | 1/23 | Atwood | 74—214 |
| 2,283,863 | 5/42 | Achterman | 74—215 X |
| 2,342,159 | 2/44 | Moran | 74—215 X |
| 2,363,378 | 11/44 | Young | 308—203 |
| 2,487,343 | 11/49 | Kopf | 308—184 |

DON A. WAITE, *Primary Examiner.*

BROUGHTON G. DURHAM, *Examiner.*